United States Patent
Jeong et al.

(10) Patent No.: US 9,387,794 B2
(45) Date of Patent: Jul. 12, 2016

(54) VEHICLE LAMP AUTOCUT APPARATUS AND METHOD

(71) Applicant: Hyundai Motor Company, Seoul (KR)

(72) Inventors: Jeong Hee Jeong, Gyeonggi-do (KR); Du Hyun Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 102 days.

(21) Appl. No.: 14/452,148

(22) Filed: Aug. 5, 2014

(65) Prior Publication Data

US 2015/0251585 A1   Sep. 10, 2015

(30) Foreign Application Priority Data

Mar. 7, 2014   (KR) .................. 10-2014-0027200

(51) Int. Cl.
| | |
|---|---|
| *G01S 19/13* | (2010.01) |
| *B60Q 1/04* | (2006.01) |
| *B60Q 3/02* | (2006.01) |
| *G01S 19/16* | (2010.01) |

(52) U.S. Cl.
CPC ............. *B60Q 1/04* (2013.01); *B60Q 3/0293* (2013.01); *G01S 19/13* (2013.01); *G01S 19/16* (2013.01)

(58) Field of Classification Search
CPC ............ B60Q 1/04; B60Q 1/34; B60Q 1/346; B60Q 1/40; B60Q 3/02; B60Q 3/0293; B60Q 2900/30; G01C 21/26; G01S 19/13; G01S 19/16; B60R 16/023
See application file for complete search history.

(56) References Cited

U.S. PATENT DOCUMENTS 6,166,698 A * 12/2000 Turnbull et al. ...... B60C 23/061
                                                                343/700 MS

FOREIGN PATENT DOCUMENTS

| JP | 10-095275 | 4/1998 |
|---|---|---|
| JP | 2010-070059 A | 4/2010 |
| JP | 2013-139172 A | 7/2013 |
| KR | 100164325 B1 | 10/1999 |
| KR | 20000018365 A | 4/2000 |

\* cited by examiner

*Primary Examiner* — Adam Tissot
*Assistant Examiner* — Edward J Pipala
(74) *Attorney, Agent, or Firm* — Mintz Levin Cohn Ferris Glovsky and Popeo, P.C.; Peter F. Corless

(57) ABSTRACT

A vehicle lamp autocut apparatus and method are provided. The vehicle lamp autocut method includes acquiring, by a controller, current positional information of a vehicle when a power supply of the vehicle is turned off and detecting whether the vehicle is safe based on the current positional information. In addition, the controller is configured to detect whether a lamp within the vehicle is a turn on state when the vehicle is safe and whether a vehicle state satisfies a lamp turn off condition when the lamp is in the turn on state. The lamp is turned off when the vehicle state satisfies the lamp off condition, thereby preventing a battery of a vehicle from being discharged.

16 Claims, 2 Drawing Sheets

VEHICLE LAMP AUTOCUT APPARATUS AND METHOD

CROSS-REFERENCE TO RELATED APPLICATION

This application is based on and claims priority from Korean Patent Application No. 10-2014-0027200, filed on Mar. 7, 2014 in the Korean Intellectual Property Office, the disclosure of which is incorporated herein in its entirety by reference.

BACKGROUND

1. Field of the Invention

The present invention relates to a vehicle lamp autocut apparatus and method of autocutting lamps based on positional information of a vehicle and lamp lighting and whether a driver exits a vehicle when a vehicle is parked or stopped.

2. Description of the Prior Art

Recently, when an occupant exits a vehicle, due to an increase in electric devices of a vehicle, a battery discharge may frequently occur. For example, when a driver leaves a vehicle for a substantial period of time when a tail lamp and/or a hazard lamp is turned on (e.g., left on after exiting the vehicle), when the driver returns to the vehicle, a battery may be discharged, such that the driver may not start a vehicle. Currently, a lamp system of a vehicle does not turn off the tail lamp when a tail lamp switch is left in a turn on state and an occupant exits the vehicle through a back seat or a passenger seat due to a blocking of a driver seat. Further, even though a driver exits a vehicle when the hazard lamp is turned on, the hazard lamp may not be turned off.

However, when a vehicle is parked at a secure place, a continuous operation of the lamps is unnecessary and a battery of the vehicle is discharged, such that a driver may not start a vehicle. Therefore, when a driver parks and stops a vehicle at a secure place and exits the vehicle, there is a need to automatically turn off the lamp to prevent a battery of a vehicle from being discharged.

SUMMARY

Accordingly, the present invention provides a vehicle lamp autocut apparatus and method of autocutting a lamp based on positional information of a vehicle and lamp lighting and whether a driver exits a vehicle when a vehicle is parked or stopped.

In one aspect of the present invention, a vehicle lamp autocut method may include: acquiring current positional information of a vehicle when a power supply of the vehicle is turned off; detecting whether the vehicle is safe based on the current positional information; detecting whether a lamp within the vehicle is turned on when the vehicle is safe; detecting whether a vehicle state satisfies a lamp turn off condition when the lamp is turned on; and turning off the lamp when the vehicle state satisfies the lamp turn off condition.

The turning off of the lamp may include: operating a timer when the vehicle state satisfies the lamp turn off condition; detecting whether the set time elapses using the timer; and turning off the lamp when the set time elapses. The vehicle lamp autocut method may further include: maintaining the lamp in a turn on state (e.g., maintaining the lamp turned on) when the set time does not elapse. In addition, the vehicle lamp autocut method may further include: maintaining the lamp in a turn on state when a door is opened or unlocked during the operation of the timer. In the detection of whether the vehicle state satisfies the lamp turn off condition, a smart key may not be present within the vehicle and whether the doors are in a closed and locked state and may be determined. The vehicle lamp autocut method may further include: in the detection of whether the vehicle state satisfies the lamp turn off condition, in response to determining that the vehicle state does not satisfy the lamp turn off condition, the lamp may be continuously turned on.

In another aspect of the present invention, a vehicle lamp autocut apparatus may include: a navigation device configured to acquire a current position of a vehicle; a smart key module configured to detect whether the smart key is present within the vehicle; a smart junction box configured to operate a lamp by detecting whether the lamp is turned on; and a controller configured to detect the current position of the vehicle when a power supply of the vehicle is turned off, whether the lamp is turned on, and whether the smart key is present within the vehicle and operate the smart junction box as the confirmation result to operate the turning off of the lamp.

The controller may be configured to transmit a lamp turn off command to the smart junction box in response to determining that the vehicle is located in a safety zone, the lamp is in a turn on state, and the smart key is not present within the vehicle. The controller may include a timer configured to output when a set time elapses and transmit the lamp turn off command to the smart junction box when the set time elapses. The controller may be configured to maintain the lamp in a turn on state when a door is opened or unlocked during the operation of the timer.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described with reference to the accompanying drawings.

Figure 1:
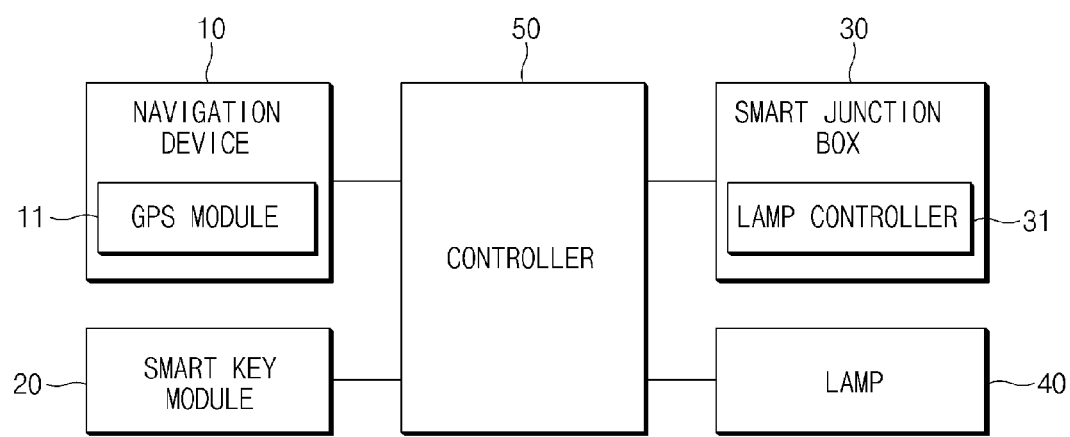
FIG. 1 is an exemplary block configuration diagram of a vehicle lamp autocut apparatus according to an exemplary embodiment of the present invention.

FIG. 1 illustrates an exemplary block configuration diagram of a vehicle lamp autocut apparatus according to an exemplary embodiment of the present invention. Referring to FIG. 1, the vehicle lamp autocut apparatus according to the exemplary embodiment of the present invention may include a navigation device 10, a smart key module (SMK) 20, a smart junction box (SJB) 30, a lamp 40, and a controller (BCM) 50.

The navigation device 10 may be a vehicle navigation device equipped within a vehicle to provide information on a current position, a surrounding map, and the like, to a user and guides paths (e.g., optimal path, shortest path, and the like) to reach a destination. The navigation device 10 may include a global positioning system (GPS) module 11 configured to receive positional information from a satellite. The navigation device 10 may be configured to acquire current positional information of a vehicle using the GPS module 11 and may be configured to transmit the acquired positional information to the controller 50.

The smart key module 20 may be configured to detect whether a smart key is present within a vehicle. The smart key module 20 may be configured to perform wireless communication with the smart key. The smart junction box 30 may be configured to execute functions such as power distribution, battery management, switch input, and various types of electronic control. Further, the smart junction box 30 may include a lamp controller 31 configured to operate the lamp 40. The lamp controller 31 may be configured to determine a lamp failure of the lamp 40 and maintain power supplied to the lamp 40 at a substantially constant voltage. The lamp controller 30 may also be configured to supply or cut off power to turn the lamp 40 on or off. A plurality of lamps 40 may be equipped within and on an exterior of the vehicle. For example, the lamp 40 may include a dome light, a back lamp, a tail lamp, a head lamp, a side lamp, and the like. The lamp 40 may be configured of a power supply of an incandescent bulb, a halogen bulb, a gas discharging lamp, a neon gas discharge lamp, a light emitting diode (LED), and the like. The controller 50 may be connected to the navigation device 10, the smart key module 20, and the smart junction box 30 via a controller area network (CAN) bus.

When the power supply of the vehicle is turned off, the controller 50 may be configured to detect whether the current vehicle is located in a safety zone based on the positional information of the vehicle received from the navigation device 10. For example, when the controller 50 receives a data value that corresponds to any one of an expressway, a general national road, a tunnel, a high-level road, a local road, and an underground road, the controller 50 may be configured to determine that a vehicle is located in a danger zone. Meanwhile, when the controller 50 receives a value that corresponds to any one of a rest area, a parking lot, an inside of an apartment complex (e.g., a garage), a park, an alley, and an inside of a building, the controller 50 may be configured to determine that the vehicle is located in a safety zone.

The controller 50 may also be configured to detect whether the lamp 40 is in a turn on state using the smart junction box 20. The controller 50 may be configured to detect whether a smart key (e.g., a key fob) is present within the vehicle using the smart key module 20 and detect whether the doors of the vehicle are in a closed and locked state using the smart junction box 30.

When the power supply of the vehicle is turned off, the controller 50 may be configured to detect the positional information of the vehicle, whether the lamp is turned on, and whether the smart key is present within the vehicle. As the confirmation result, in response to determining that the vehicle is a safety zone (e.g., a safe area), the lamp 40 is in a turn on state, the smart key is not present within the vehicle, and the doors are in the closed and locked state, the controller 50 may be configured to operate and set a timer (not illustrated). In particular, the timer (not illustrated) may be mounted within the controller 50 and when a set time elapses, a clock may be generated and initialized That is, when the set time elapses, an alert may be output to trigger another operation by the controller 50.

Additionally, when the controller 50 receives a signal indicating the elapse of set time from the timer (not illustrated), the controller 50 may be configured to transmit a lamp turn off command to the smart junction box 30. Therefore, when the smart junction box 30 receives the lamp turn off command from the controller 50, the smart junction box 30 may be configured to operate the lamp controller 31 to turn off the lamp 40. When the door is opened or unlocked during the operation of the timer, the controller 50 may be configured to maintain the lamp 40 in the turn on state. In particular, the controller 50 may be configured to stop and initialize the operation of the timer.

Figure 2:
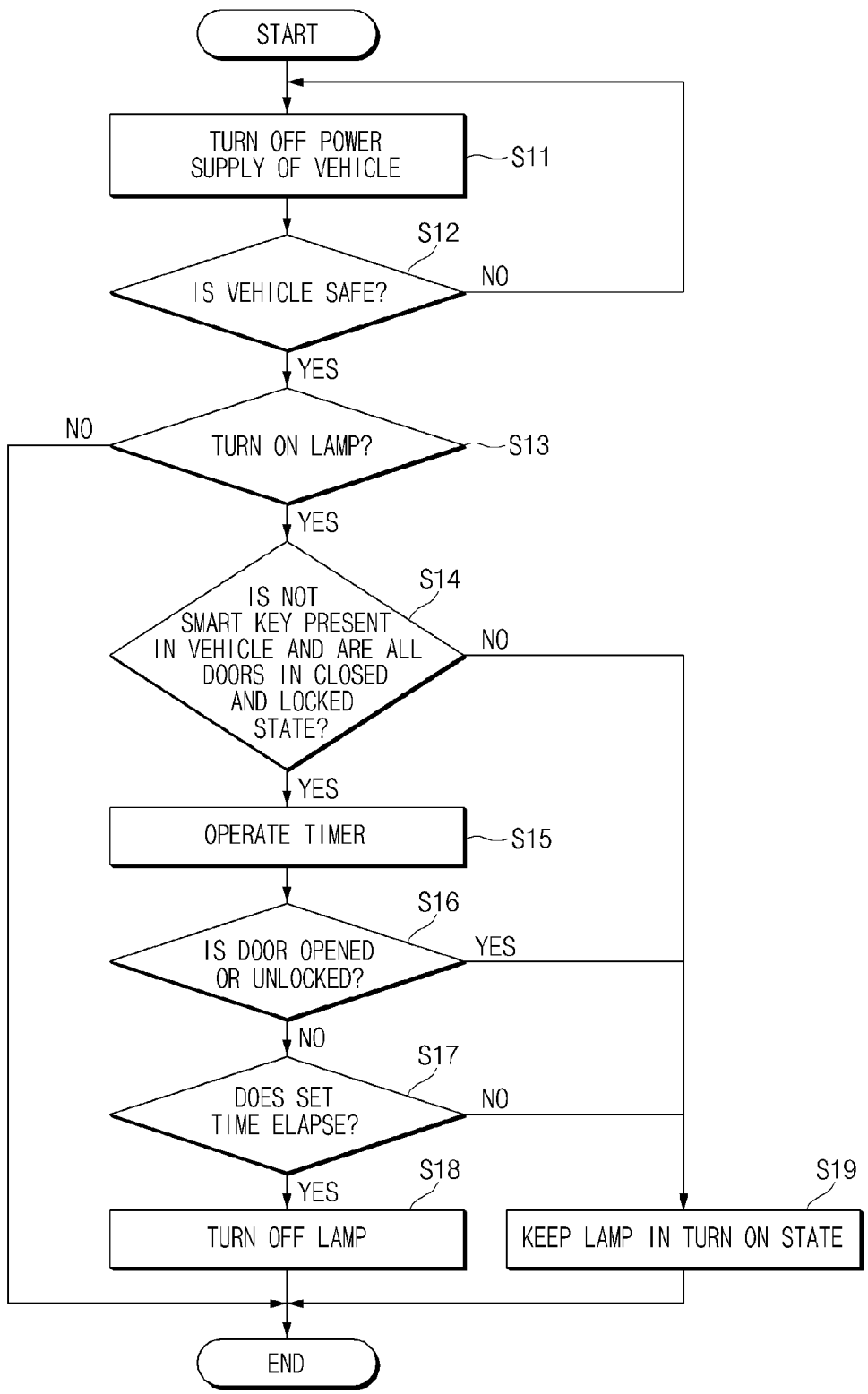
FIG. 2 is an exemplary flow chart of a vehicle lamp autocut method according to an exemplary embodiment of the present invention.

FIG. 2 is an exemplary flow chart of a vehicle lamp autocut method according to an exemplary embodiment of the present invention. As illustrated in FIG. 2, the vehicle lamp autocut apparatus (hereinafter, referred to as an autocut apparatus) according to the exemplary embodiment of the present invention may be configured to detect whether the vehicle is located in the safety zone when the power supply of the vehicle is turned off (S11 and S12). In other words, when the controller 50 of the autocut apparatus senses a vehicle power off, the controller 50 may be configured to detect whether the vehicle is located in the safety zone based on the current positional information of the vehicle received from the navigation device 10.

When the vehicle is located in the safety zone, the controller 50 of the autocut apparatus may be configured to detect whether the lamp 40 is turned on using the smart junction box 30 (13). When the lamp 40 is in a turn on state, the controller 50 may be configured to detect whether a vehicle state satisfies a lamp turn off condition (S14). In other words, the controller 50 may be configured to detect whether the smart key is present in the vehicle and whether the doors are in the closed and locked state. When the vehicle state satisfies the lamp turn off condition, the controller 50 may be configured to operate the timer (S15). In particular, the timer reaches the set time to generate the clock (e.g., alert).

The controller 50 may be configured to detect whether the door is opened or unlocked during the operation of the timer (S16). In response to determining that the door is not opened or unlocked during the operation of the timer, the controller 50 may be configured to detect whether the set time elapses (S17). In other words, the controller 50 may be configured to detect whether the signal informing the elapse of the set time is received from the timer. The controller 50 may be configured to operate the smart junction box 30 when the set time elapses to turn off the lamp (S18).

Moreover, in response to determining in step (S14) that the vehicle state does not satisfy the lamp turn off condition, the controller 50 may be configured to maintain the lamp 40 in the turn on state (S19). Further, in response to determining in step S16 that the door is opened or unlocked, the controller 50 may be configured to continuously turn on the lamp 40 (S19). Further, in response to determining in step (S 17) that the set time does not elapse, the controller 50 may be configured to maintain the lamp 40 in the turn on state (S19).

According to the exemplary embodiments of the present invention, it may be possible to prevent the battery from being discharged even though the driver exits from the vehicle when the lamps are turned on by autocutting the lamps based on the positional information of the vehicle and the lamp lighting and whether the driver exits from the vehicle when the vehicle is parked or stopped.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. A vehicle lamp autocut method, comprising:
   detecting, by a controller, a current position of a vehicle when a power supply of the vehicle is turned off based on current positional information acquired by a navigation device;
   detecting, by the controller, whether the vehicle is located in a safety zone based on the current position of the vehicle;
   detecting, by the controller, whether a lamp within the vehicle is in a turn on state when the vehicle is located in the safety zone using a smart junction box configured to operate the lamp;
   detecting, by the controller, whether a vehicle state satisfies a lamp turn off condition when the lamp is in the turn on state; and
   controlling, by the controller, operation of the smart junction box so as to turn off the lamp when the vehicle state satisfies the lamp turn off condition.

2. The vehicle lamp autocut method of claim 1, wherein the turning off of the lamp includes:
   operating, by the controller, a timer when the vehicle state satisfies the lamp turn off condition;
   detecting, by the controller, whether the set time elapses using the timer; and
   turning off, by the controller, the lamp when the set time elapses.

3. The vehicle lamp autocut method of claim 2, further comprising:
   controlling, by the controller, operation of the smart junction box so as to maintain the lamp in a turn on state when the set time does not elapse.

4. The vehicle lamp autocut method of claim 2, further comprising:
   controlling, by the controller, operation of the smart junction box so as to maintain the lamp in a turn on state when a door is opened or unlocked during the operation of the timer.

5. The vehicle lamp autocut method of claim 1, wherein in the detection of whether the vehicle state satisfies the lamp turn off condition, a smart key is not present within the vehicle and whether the doors are in a closed and locked state is detected.

6. The vehicle lamp autocut method of claim 1, further comprising:
   controlling, by the controller, operation of the smart junction box so as to continuously turn on the lamp the lamp in response to determining that the vehicle state does not satisfy the lamp turn off condition.

7. A vehicle lamp autocut apparatus, comprising:
   a navigation device configured to acquire current positional information of a vehicle;
   a smart key module configured to detect whether a smart key is present within the vehicle;
   a smart junction box configured to operate a lamp within the vehicle; and
   a controller configured to detect a current position of the vehicle based on the acquired current positional information when a power supply of the vehicle is turned off, whether the lamp is turned on, and whether the smart key is present within the vehicle and control operation of the smart junction box so as to turn off the lamp when the smart key is not present within the vehicle.

8. The vehicle lamp autocut apparatus of claim 7, wherein the controller is configured to transmit a lamp turn off command to the smart junction box in response to determining that the vehicle is located in a safety zone, the lamp is in a turn on state, and the smart key is not present within the vehicle.

9. The vehicle lamp autocut apparatus of claim 8, wherein the controller includes a timer configured to notify that a set time elapses and the controller is configured to transmit the lamp turn off command to the smart junction box when the set time elapses.

10. The vehicle lamp autocut apparatus of claim 9, wherein the controller is configured to control operation of the smart junction box so as to maintain the lamp in a turn on state when a door is opened or unlocked during the operation of the timer.

11. A non-transitory computer readable medium containing program instructions executed by a controller, the computer readable medium comprising:
   program instructions that detect a current position of a vehicle when a power supply of the vehicle is turned off based on current positional information acquired by a navigation device;
   program instructions that detect whether the vehicle is located in a safety zone based on the current position of the vehicle;
   program instructions that detect whether a lamp within the vehicle is in a turn on state when the vehicle is located in the safety zone using a smart junction box configured to operate the lamp;
   program instructions that detect whether a vehicle state satisfies a lamp turn off condition when the lamp is in the turn on state; and program instructions that control operation of the smart junction box so as to turn off the lamp when the vehicle state satisfies the lamp turn off condition.

12. The non-transitory computer readable medium of claim 11, further comprising:
    program instructions that operate a timer when the vehicle state satisfies the lamp turn off condition;
    program instructions that detect whether the set time elapses using the timer; and
    program instructions that turn off the lamp when the set time elapses.

13. The non-transitory computer readable medium of claim 12, further comprising:
    program instructions that control operation of the smart junction box so as to maintain the lamp in a turn on state when the set time does not elapse.

14. The non-transitory computer readable medium of claim 12, further comprising:
    program instructions that control operation of the smart junction box so as to maintain the lamp in a turn on state when a door is opened or unlocked during the operation of the timer.

15. The non-transitory computer readable medium of claim 11, wherein in the detection of whether the vehicle state satisfies the lamp turn off condition, a smart key is not present within the vehicle and whether the doors are in a closed and locked state is detected.

16. The non-transitory computer readable medium of claim 11, further comprising:
    program instructions that control operation of the smart junction box so as to continuously turn on the lamp the lamp in response to determining that the vehicle state does not satisfy the lamp turn off condition.

* * * * *